United States Patent

Aoki et al.

[11] Patent Number: 5,795,558
[45] Date of Patent: Aug. 18, 1998

[54] POSITIVE ELECTRODE ACTIVE MATERIAL FOR LITHIUM SECONDARY BATTERY METHOD OF PRODUCING

[75] Inventors: Takashi Aoki; Mikito Nagata; Hisashi Tsukamoto, all of Kyoto, Japan

[73] Assignee: Japan Storage Battery Co., Ltd., Kyoto, Japan

[21] Appl. No.: 947,494

[22] Filed: Oct. 9, 1997

Related U.S. Application Data

[62] Division of Ser. No. 774,226, Dec. 27, 1996, Pat. No. 5,718,989.

[30] Foreign Application Priority Data

Dec. 29, 1995 [JP] Japan ................... 7-353033
Dec. 5, 1996 [JP] Japan ................... 8-342516

[51] Int. Cl.$^6$ .................... C01G 51/00; C01G 53/00
[52] U.S. Cl. .................... 423/594; 429/223
[58] Field of Search .................... 29/623.1; 429/223, 429/218; 252/182.1; 423/594, 641, 600

[56] References Cited

U.S. PATENT DOCUMENTS

| | | | |
|---|---|---|---|
| Re. 34,991 | 7/1995 | Yoshino et al. | 429/194 |
| 4,844,999 | 7/1989 | Oshitani et al. | 429/223 |
| 5,405,714 | 4/1995 | Terasaka et al. | 429/52 |
| 5,609,975 | 3/1997 | Hasegawa et al. | 429/218 X |
| 5,629,110 | 5/1997 | Kobayashi et al. | 429/223 |
| 5,631,105 | 5/1997 | Hasegawa et al. | 429/223 X |
| 5,654,115 | 8/1997 | Hasegawa et al. | 429/218 |
| 5,672,447 | 9/1997 | Yamawaki et al. | 429/223 |
| 5,677,087 | 10/1997 | Amine et al. | 429/223 X |
| 5,698,338 | 12/1997 | Barker et al. | 429/223 |

FOREIGN PATENT DOCUMENTS

| | | | |
|---|---|---|---|
| 0 205 856 | 12/1986 | European Pat. Off. | H01M 10/40 |
| 0 714 144 | 11/1995 | European Pat. Off. | H01M 4/52 |
| 0 744 780 | 11/1996 | European Pat. Off. | H01M 4/48 |

OTHER PUBLICATIONS

Patent Abstracts of Japan, vol. 016, No. 178 (E-1196), Apr. 28, 1992, & JP 04 022066 A (Asahi Chem Ind Co Ltd), Jan. 27, 1992, *Abstract.

*Primary Examiner*—Anthony Skapars
*Attorney, Agent, or Firm*—Sughrue, Mion, Zinn, Macpeak & Seas, PLLC

[57] ABSTRACT

A positive electrode active material for a lithium secondary battery is made of $LiNi_{1-x-y-z}Co_xMn_yAl_zO_2$, in which x, y and z satisfy relations of $0 \leq y \leq 0.3$, $0 \leq x \leq 0.25$, $0 \leq z \leq 0.15$.

8 Claims, 4 Drawing Sheets x in $LiNi_{1-x}Co_xAl_{0.1}O_2$ y in LiNi$_{0.85-y}$Co$_{0.15}$Al$_y$O$_2$

POSITIVE ELECTRODE ACTIVE MATERIAL FOR LITHIUM SECONDARY BATTERY METHOD OF PRODUCING

This is a divisional of application Ser. No. 08/744,226 filed Dec. 27, 1996, now U.S. Pat. No. 5,718,989.

BACKGROUND OF THE INVENTION

1. Field of the Invention

The present invention relates to an active material for a lithium secondary battery, a method of producing thereof, and a lithium secondary battery per se using the active material.

2. Description of the Related Art

The remarkable progress of electronic techniques in recent years has actualized reduction in size and weight of electronic appliances in rapid succession. With such actualization, more and more reduction in size and weight and increase in energy density have been required of batteries which are electric sources of those electric appliances.

Conventionally, an aqueous solution type battery such as a lead batteries and a nickel-cadmium battery has been used mainly as a general-purpose battery. The aqueous solution type battery is excellent in cycle characteristic but it is not said to be satisfactory in terms of battery weight and energy density.

Therefore, a non-aqueous electrolyte battery high in battery voltage and having high energy density has begun to be used recently. A typical example of the non-aqueous electrolyte battery is a lithium secondary battery in which material capable of reversible intercalation of lithium ions is used as an electrode material.

In rough comparison in energy density among various types of small-size secondary batteries used as portable appliance electric sources, it is said that the energy density of a lithium secondary battery is 60–125 Wh/kg and 190–310 Wh/l whereas the energy density of a lead battery is 20–40 Wh/kg and 50–100 Wh/l, the energy density of a nickel-cadmium battery is 30–60 Wh/kg and 100–160 Wh/l and the energy density of a nickel-hydrogen battery is 45–65 Wh/kg and 160–200 Wh/l.

Although lithium secondary batteries are expected to be used as supply electric sources for portable appliances relatively large in consumed electric power because they are excellent in energy density as described above, improvement in safety and further improvement in cycle characteristic are required as one important problem. Improvement in thermal stability of active materials is important for improvement in safety whereas reversibility (doping and de-doping) of intercalation of positive and negative active materials is of course also important for improvement in cycle characteristic.

As positive electrode active materials for use in lithium secondary batteries, there are composite oxide of lithium and transition metals and composite oxide of lithium, transition metals and non-transition metals. Among such materials, for example, $Li_xMO_2$ (M: transition metal; $0.5 \leq x \leq 1.10$) as disclosed in Japanese Patent Unexamined Publication No. Hei-4-249074 and $Li_xM_yN_zO_2$ (M: at least one kind selected from the group of transition metals; N: at least one kind selected from the group of non-transition metals; $0.05 \leq x \leq 1.10$; $0.85 \leq y \leq 1.00$; $0 \leq z \leq 0.10$) as disclosed in Japanese Patent Unexamined Publication No. Hei-4-22066 are known. Among lithium secondary batteries using these positive electrode active materials, however, it is a fact that no battery exhibiting sufficient safety and sufficient cycle characteristic while keeping high- energy density has been obtained under present circumstances.

SUMMARY OF THE INVENTION

In order to solve the above problems, it is an object of the present invention to provide a lithium secondary battery which is high in energy density as well as excellent in safety and cycle characteristic.

A positive electrode active material for a lithium secondary battery according to the present invention comprises $LiNi_{1-x-y-z}Co_xMn_yAl_zO_2$ wherein x, y and z satisfy relations of $0 \leq y \leq 0.3$, $0 \leq x \leq 0.25$, $0 \leq z \leq 0.15$.

A method of producing a positive electrode active material for a lithium secondary battery according to the present invention comprises the steps of: mixing at least one of $\beta\text{-}Ni_{1-x}Co_x(OH)_2$ and $\beta\text{-}Ni_{1-x}Co_xOOH$ in which x and y satisfy relations of $0 \leq y \leq 0.3$ and $0 \leq x \leq 0.25$, a Li supply source material which is a Li chemical compound used at a time of forming Li—Ni—Co—Al composite oxide, and an Al supply source material which is an Al chemical compound used at a time of forming Li—Ni—Co—Al composite oxide; and burning the resulting mixture.

A lithium secondary battery according to the present invention comprises a positive electrode, a negative electrode, a separator, a positive electrode terminal, a case serving as a negative electrode terminal and an electrolytic solution; wherein the positive electrode active material comprises $LiNi_{1-x-y-z}Co_xMn_yAl_zO_2$ wherein x, y and z satisfy relations of $0 \leq y \leq 0.3$, $0 < x \leq 0.25$, $0 \leq z \leq 0.15$.

According to the present invention, it should be noted that the value of the present invention is in that the optimum proportion of Ni, Co, Mn and Al not only for improving cycle characteristic remarkably but also for improving battery safety without lowering of energy density is found out. As a result, it can be made possible to provide a lithium secondary battery excellent both in cycle characteristic and in thermal stability and easy to handle.

DETAILED DESCRIPTION OF THE INVENTION

Figure 1:
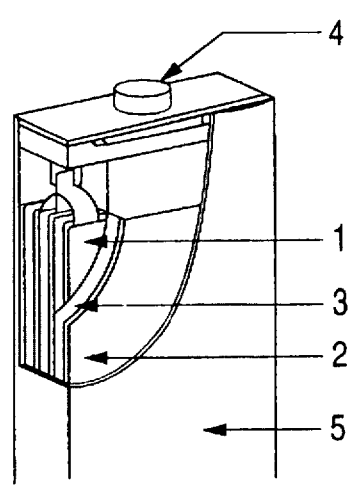
FIG. 1 is a view showing a battery as an embodiment of the present invention.

Detailed description of the present invention will be described as follows.

As a result of diligent study made by the inventors of the present invention, it was found that a lithium secondary battery excellent in cycle characteristic can be obtained by limiting the amounts of Ni, Co, Mn and Al in Li-Ni-Co-Mn-Al composite oxide to certain numerical value ranges respectively.

In a positive electrode of the lithium secondary battery according to the present invention, when y=0, $LiNi_{1-x-y-z}Co_xMn_yAl_zO_2$ satisfies relations of $0.15 \leq x \leq 0.25$ and $0 \leq z \leq 0.15$, or when $0 \leq y \leq 0.3$, satisfies relations of $0 \leq x \leq 0.25$, $0 \leq z \leq 0.15$ and $x+y \leq 0.4$. Preferably, x satisfy a relation of $0 \leq x \leq 0.2$, more preferably, $0 \leq x \leq 0.1$. Further, preferably, y satisfy a relation of $0.1 \leq x \leq 0.2$.

Further, in a method of producing a positive electrode active material for use in lithium secondary batteries, $\beta\text{-Ni}_{1-x-y-z}\text{Co}_x\text{Mn}_y(\text{OH})_2$ or $\beta\text{-Ni}_{1-x-y}\text{Co}_x\text{Mn}_y\text{OOH}$ ($0 \leq x \leq 0.25$, $0 \leq y \leq 0.3$) synthesized by co-precipitation, a Li supply source material which is a Li chemical compound such as LiOH, $\text{Li}_2\text{CO}_3$ or/and $\text{LiNO}_3$ used at the time of forming Li-Ni-Co-Mn-Al composite oxide, and an Al supply source material which is an Al chemical compound such as $\text{Al(OH)}_3$, $\text{Al}_2\text{O}_3$, or the like, used at the time of forming Li-Ni-Co-Mn-Al composite oxide are mixed; and the resulting mixture to synthesize the positive electrode active material is burned. Further, a lithium secondary battery according to the present invention uses the aforementioned positive electrode active material for lithium secondary batteries. Also in this case, preferably, x satisfy a relation of $0 \leq x \leq 0.2$, more preferably, $0 \leq x \leq 0.1$. Further, preferably, y satisfy a relation of $0.1 \leq x \leq 0.2$.

In the present invention, it should be noted that a remarkable effect for improvement in safety and cycle characteristic could be achieved by limiting the amounts of Ni, Co, Mn and Al to certain numerical value ranges of $0 \leq x \leq 0.25$, $0 \leq y \leq 0.3$, $0 \leq z \leq 0.15$ and $x+y \leq 0.4$ in a positive electrode active material for lithium secondary batteries, in which $\text{LiNi}_{1-x-y-z}\text{Co}_x\text{Mn}_y\text{Al}_z\text{O}_2$ satisfies relations of $0.15 < x \leq 0.25$ and $0 \leq z \leq 0.15$ when y=0, or relations of $0 \leq x \leq 0.25$, $0 \leq z \leq 0.15$ and $x+y \leq 0.4$ are satisfied when $0 \leq y \leq 0.3$.

Use of composite oxide of Li, transition metals such as Ni and Co and non-transition metals such as Al as a positive electrode active material for lithium secondary batteries is disclosed, in fact, in the aforementioned Japanese Patent Unexamined Publication No. Hei-4-22066. However, only the total amount of transition metals is defined therein, and relations between transition metals is not defined at all therein. The inventors of the Japanese Patent Unexamined Publication No. Hei-4-22066 did not recognize the problem that the quantitative relations between transition metals have influence on safety and cycle characteristic.

That is, the technical concept that improvement in safety and cycle characteristic can be achieved by limiting the amounts of Ni, Co, Mn and Al to certain numerical value ranges in composite oxide of Li, Ni, Co, Mn and Al is a finding which had been never obtained before the inventors of the present application have found.

Although the reason why safety and cycle characteristic are improved remarkably by employing the configuration of the present invention is not always elucidated by the inventors of the present application perfectly, the reason is guessed as follows. That is, it is considered that addition of Co and Mn suppresses displacement between positive electrode active material crystal layers at the time of de-doping of Li and that addition of Al improves thermal stability by introducing a moderate amount of inactive points into a crystal lattice as will be shown in the following data. Further, the effect of use of a co-precipitate is considered to be based on the fact that the crystalline structure of the burned material is more homogeneous because a solid solution which is a mixture more homogeneous than a simple mixture is used as a starting raw material.

Incidentally, if the amount of addition of Co exceeds 25%, not only the cost of the active material is increased but also the lowering of initial electric discharge capacity is brought about. Similarly, if the amount of addition of Mn exceeds 30% and the amount of addition of Al exceeds 15%, the lowering of electric discharge capacity is brought about.

Accordingly, the amounts of Co, Mn and Al are preferably selected to be not larger than those values respectively.

Although the present invention will be described in detail below on the basis of an embodiment, it is to be understood that the present invention is not limited to the following embodiment but it may be changed suitably without departing from the gist thereof.

Preparation of Positive Electrode Active Material

Li-Ni-Co-Mn-Al composite oxides were prepared while x was set to 0, 0.10, 0.15, 0.20 and 0.25, y was set to 0, 0.1, 0.2, 0.3 and 0.4 and z was set to 0, 0.5, 1.5 and 2.0 in $\text{LiNi}_{1-x-y-z}\text{Co}_x\text{Mn}_y\text{Al}_z\text{O}_2$.

As a preparation method, after $\beta\text{-Ni}_{1-x-y-z}\text{Co}_x\text{Mn}_y(\text{OH})_2$ synthesized by co-precipitation, $\text{Al(OH)}_3$ and LiOH were mixed in a predetermined proportion, the mixture was burned at 720° C. for 40 hours under an atmosphere of oxygen partial pressure of 0.5 atm. After burning, these were ground to an average of 3.5 μm by a ball mill to thereby obtain a lithium secondary battery-use positive electrode active material.

On the other hand, for comparison, after respective hydroxides of Li, Ni, Co, Mn and Al were mixed in a predetermined proportion, a positive electrode active material for lithium secondary batteries was prepared under the same condition.

Incidentally, the burning temperature and the oxygen partial pressure may be selected suitably to be in a range of from 300° to 950° C. and in a range of from 0.1 to 100 atm., respectively.

Preparation of Carbon Type Electrically Conductive Agent

An acetylene black granule was prepared by kneading, granulating and drying 98 parts by weight of acetylene black and 2 parts by weight of CMC as a binding agent. Then, the granule was ground by a ball mill using a 3.0 mm-diameter zirconia ball to thereby prepare a carbon type electrically conductive agent. Incidentally, the specific surface area of acetylene black used herein was not smaller than 30 m²/g. Further, as an example of the conductive material, ketchen black, furnace black and the like are used singly or in combination.

Preparation of Positive Electrode 1.5 parts by weight of the carbon type electrically conductive agent was mixed into 100 parts by weight of the aforementioned $\text{LiNi}_{1-x-y-z}\text{Co}_x\text{Mn}_y\text{Al}_z\text{O}_2$ to thereby obtain a mixture. Polyvinylidene fluoride as a binder was added to the above mixture by 4 parts by weight with respect to the whole and N-methylpyrolidone was added suitably thereto. The resulting mixture was kneaded to obtain active material paste. Then, the active material paste was applied onto an electrode substrate of aluminum foil and dried to prepare a positive electrode for a lithium secondary battery.

Incidentally, other examples of the binder include: polytetrafluoroethylene; rubber type high molecules; mixtures of polytetrafluoroethylene, rubber type high molecules and cellulose type high molecules; copolymers mainly containing polyvinylidene fluoride; etc.

Further, other examples of the electrode substrate include an aluminum lath board, a stainless steel plate, etc.

Preparation of Negative Electrode

An 80:20 weight proportion mixture of mesocarbon microbeads which is formed from mesophase globules as raw material generated in a pitch-carbonating process and flake artificial graphite was used as a lithium ion intercalation member. N-methyl pyrolidone was added suitably to the intercalation member with use of styrene-butadiene rubber as a binder to form paste. The paste was applied onto a substrate of copper foil and dried to prepare a negative electrode.

Incidentally, the particle size of mesocarbon black microbeads and flake artificial graphite was in a range of from 5 to 50 μm and the surface area thereof was in a range of from 4 to 20 m²/g.

Preparation of Non-aqueous Electrolyte

Non-aqueous electrolyte was prepared by dissolving 1 mol/l of $LiPF_6$ in a 1:1 volume proportion mixture solvent of ethylene carbonate and diethyl carbonate. The non-aqueous electrolyte is not limited to the above description, but various solutions, for example, a solution obtained by dissolving a solute such as $LiBF_6$, $LiClO_4$, or the like, in a solvent such as sulfolane, propylene carbonate, gammabutyrolactone, 1,2-butylene carbonate, dimethyl carbonate, or the like, or a mixture solvent of any of those mentioned above and a low boiling point solvent such as 1,2-dimethoxyethane, or the like, can be used.

Separator

A polyethylene porous film having a thickness of 25 μm, a porosity of 40%, a mean through-hole size of 0.01 μm and a shear strength of 0.7 kg in a width of 10 mm was used as a separator. The separator is not limited specifically, but various separators used heretofore may be used.

Production of Lithium Secondary Battery

The aforementioned positive and negative electrodes, separator and electrolyte were put in rectangular battery cases to thereby produce 250 kinds ((5 kinds of x)×(5 kinds of y)×(5 kinds of z)×(2 kinds of starting materials)) of non-aqueous electrolyte battery samples, which are different from each other only in prescription of the positive electrode active material. FIG. 1 is a schematic view of this battery. Main constituent elements of this battery are a positive electrode 1, a negative electrode 2, a separator 3, a positive electrode terminal 4, a case 5 serving as a negative electrode terminal, an electrolytic solution (not shown), etc.

Testing Method 10 samples per kind of the aforementioned batteries were subjected to a cycle test under the following condition.

Charge: {200 mA constant current}/{4.1 V constant voltage×5 h (25° C.)}

Discharge: 400 mA constant current, termination constant voltage (25° C.)

Testing Result

Tables 1 to 5 show the mean values of electric discharge capacities at the 50th cycle of each of the respective batteries.

TABLE 1

| | | x | | | | |
|---|---|---|---|---|---|---|
| y = 0 | | 0 | 0.1 | 0.15 | 0.2 | 0.25 |
| z | 0 | 748 | 752 | 891 | 952 | 832 |
| | | (728) | (738) | (883) | (940) | (819) |
| | 0.05 | 749 | 753 | 891 | 952 | 831 |
| | | (730) | (736) | (882) | (941) | (821) |
| | 0.1 | 748 | 750 | 892 | 950 | 830 |
| | | (731) | (738) | (882) | (941) | (821) |
| | 0.15 | 749 | 751 | 890 | 950 | 831 |
| | | (731) | (739) | (880) | (940) | (820) |
| | 0.2 | 641 | 642 | 713 | 771 | 650 |
| | | (629) | (630) | (709) | (755) | (639) |

(mAh)

TABLE 2

| | | x | | | | |
|---|---|---|---|---|---|---|
| y = 0.1 | | 0 | 0.1 | 0.15 | 0.2 | 0.25 |
| z | 0 | 830 | 850 | 890 | 880 | 832 |
| | | (820) | (835) | (885) | (870) | (825) |
| | 0.05 | 825 | 840 | 875 | 890 | 831 |
| | | (820) | (836) | (868) | (880) | (821) |
| | 0.1 | 820 | 835 | 860 | 870 | 820 |
| | | (815) | (825) | (855) | (865) | (810) |
| | 0.15 | 815 | 825 | 855 | 865 | 810 |
| | | (810) | (816) | (825) | (840) | (805) |
| | 0.2 | 740 | 740 | 742 | 742 | 741 |
| | | (720) | (720) | (715) | (717) | (717) |

(mAh)

TABLE 3

| | | x | | | | |
|---|---|---|---|---|---|---|
| y = 0.2 | | 0 | 0.1 | 0.15 | 0.2 | 0.25 |
| z | 0 | 880 | 860 | 830 | 825 | 750 |
| | | (875) | (855) | (825) | (810) | (745) |
| | 0.05 | 860 | 850 | 825 | 815 | 745 |
| | | (855) | (845) | (818) | (805) | (738) |
| | 0.1 | 845 | 845 | 820 | 815 | 741 |
| | | (830) | (830) | (815) | (805) | (730) |
| | 0.15 | 830 | 840 | 815 | 810 | 725 |
| | | (825) | (815) | (810) | (805) | (700) |
| | 0.2 | 725 | 725 | 720 | 720 | 715 |
| | | (715) | (715) | (713) | (713) | (712) |

(mAh)

TABLE 4

| | | x | | | | |
|---|---|---|---|---|---|---|
| y = 0.3 | | 0 | 0.1 | 0.15 | 0.2 | 0.25 |
| z | 0 | 870 | 830 | 765 | 755 | 750 |
| | | (860) | (815) | (745) | (745) | (720) |
| | 0.05 | 850 | 815 | 760 | 745 | 730 |
| | | (835) | (805) | (755) | (730) | (725) |
| | 0.1 | 840 | 815 | 755 | 720 | 700 |
| | | (835) | (810) | (730) | (705) | (690) |
| | 0.15 | 830 | 825 | 750 | 735 | 725 |
| | | (820) | (820) | (740) | (720) | (705) |
| | 0.2 | 725 | 715 | 713 | 700 | 650 |
| | | (700) | (700) | (695) | (680) | (635) |

(mAh)

TABLE 5

| | | x | | | | |
|---|---|---|---|---|---|---|
| y = 0.4 | | 0 | 0.1 | 0.15 | 0.2 | 0.25 |
| z | 0 | 765 | 760 | 730 | 725 | 715 |
| | | (750) | (745) | (720) | (700) | (700) |
| | 0.05 | 735 | 745 | 730 | 710 | 703 |
| | | (715) | (700) | (705) | (705) | (690) |
| | 0.1 | 695 | 690 | 690 | 675 | 655 |
| | | (670) | (665) | (675) | (650) | (650) |
| | 0.15 | 640 | 630 | 630 | 630 | 625 |
| | | (630) | (625) | (605) | (625) | (620) |

TABLE 5-continued

| y = 0.4 | x | | | | |
|---|---|---|---|---|---|
| | 0 | 0.1 | 0.15 | 0.2 | 0.25 |
| 0.2 | 620 (605) | 620 (605) | 615 (603) | 615 (605) | 610 (600) |
| | | | | | (mAh) |

In these tables, the value shown in the upper portion of each section is of the battery using the positive electrode active material synthesized with $\beta$-$Ni_{1-x}Co_xMn(OH)_2$ as starting material, and the parenthesezed values in the lower portion of each section is of the battery using the positive electrode active material synthesized with individual hydroxides of nickel, cobalt and manganese as stating material.

Figure 2:
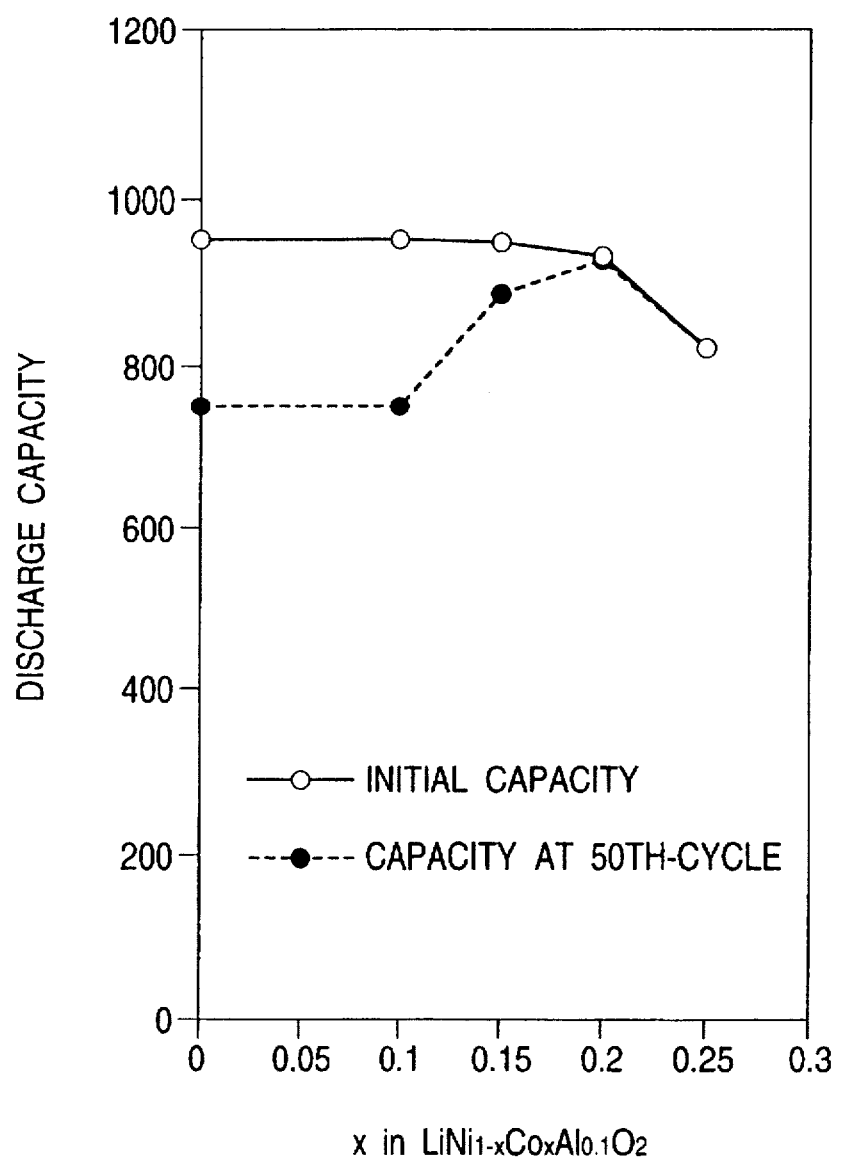
FIG. 2 is a graph showing electric discharge capacity after a cycle test.
Figure 3:
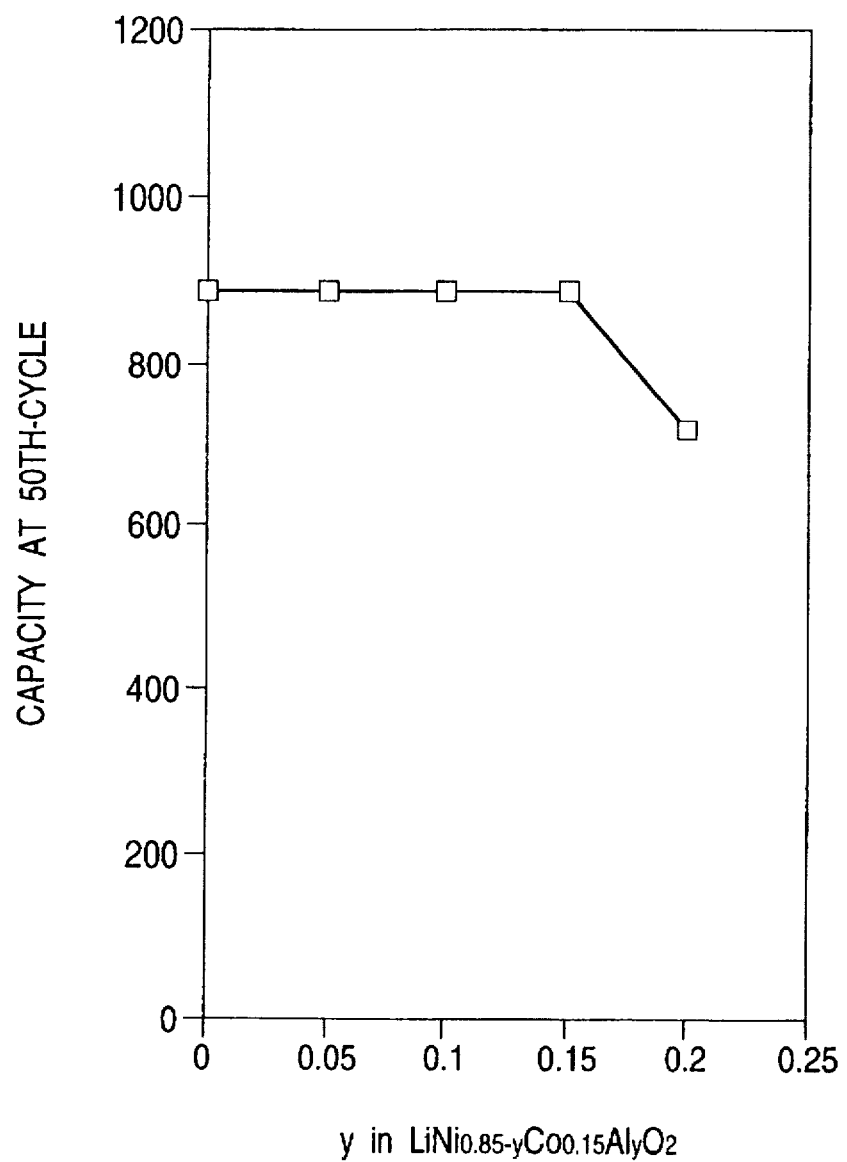
FIG. 3 is a graph showing electric discharge capacity after a cycle test.

FIG. 2 is a graph showing the relation between the value of x when y=0 and z=0.1, and the electric discharge capacity, and FIG. 3 is a graph showing the relation between the value of z when x=0.15 and y=0, and the electric discharge capacity.

It is apparent from these results that lithium secondary batteries using the positive electrode active material satisfying the relations of $0.15 \leq x \leq 0.25$ and $z \leq 0.15$ when y=0 in $LiNi_{1-x-y-z}Co_xMn_yAl_zO_2$ are excellent in cycle characteristic.

It is further apparent that lithium secondary batteries using the positive electrode active material satisfying the relations of $0 \leq x \leq 0.25$, $0<y<0.3$, $0 \leq z \leq 0.15$ and $x+y \leq 0.4$ when $0 \leq y \leq 0.3$ in $LiNi_{1-x-y-z}Co_xMn_yAl_zO_2$ are also excellent in cycle characteristic.

Incidentally, z=0 is not preferable because addition of Al has an operational effect of improving battery safety by reducing the heating reaction rate as well as reducing the total heat release value.

Figure 4:
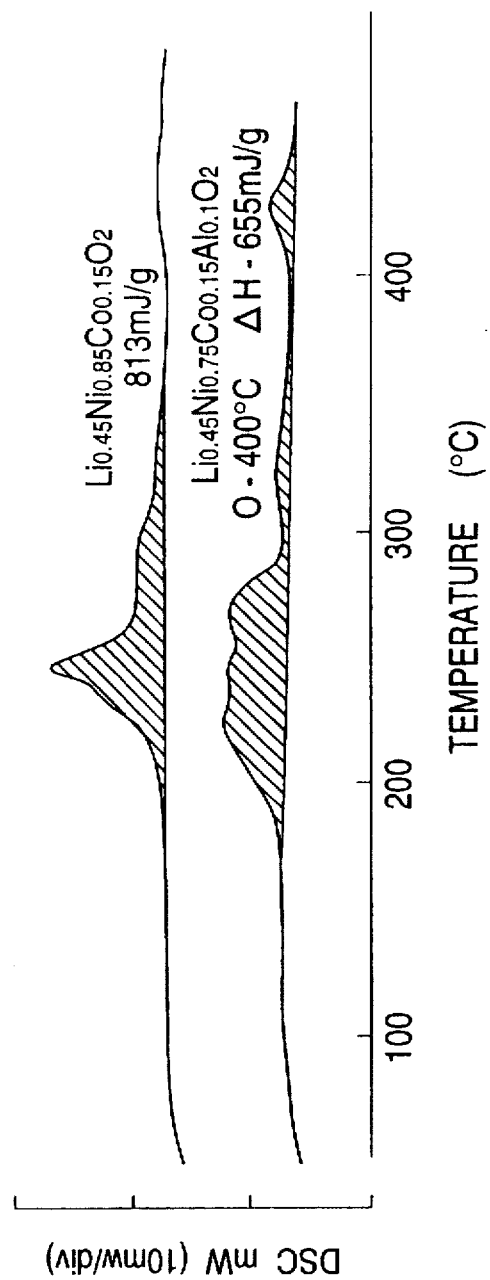
FIG. 4 is a graph showing heat generating characteristic.

For reference, FIG. 4 shows DSC data under the conditions of z=0.1 and x=0.15 when y=0. The fact that the heat release peak in the DSC data is broad is an evidence of the above description. Suppression of heat releasing is very important for battery safety in abnormal use.

It is further apparent that batteries in the upper portions in the respective sections in Tables 1 to 5 using $\beta$-$Ni_{1-x}Co_xMn_y(OH)_2$ synthesized by co-precipitation, $Al(OH)_3$ and LiOH as raw materials for preparing a positive electrode active material are superior to batteries parenthesezed in the lower portions in the respective sections in Tables 1 to 5 using respective hydroxides of Li, Ni, Co and Mn.

Although this embodiment has shown the case where $\beta$-$Ni_{1-x}Co_xMn_y(OH)_2$ synthesized by co-precipitation, $Al(OH)_3$ and LiOH are used as raw materials for preparing a positive electrode active material, the same result is obtained also in the case of use of $\beta$-$Ni_{1-x}Co_xMn_yOOH$ ($0 \leq x \leq 0.25$, $0 \leq y \leq 0.3$) synthesized by co-precipitation. Further, the same result is obtained also in the case where, other than LiOH, a Li chemical compound such as $Li_2CO_3$ or/and $LiNO_3$ serving as a Li supply source at the time of forming Li—Ni—Co—Al composite oxide is used and, other than $Al(OH)_3$, an Al chemical compound such as $Al_2O_3$ serving as an Al supply source at the time of forming Li-Ni-Co-Mn-Al composite oxide is used.

It is to be kept in mind that the value of the present invention is in that the optimum proportion of Ni, Co, Mn and Al not only for improving cycle characteristic remarkably but also for improving battery safety without lowering of energy density is found out. As a result, it can be made possible to provide a lithium secondary battery excellent both in cycle characteristic and in thermal stability and easy to handle.

What is claimed is:

1. A method of producing a positive electrode active material for a lithium secondary battery comprising the steps of:

mixing at least one of $\beta$-$Ni_{1-x}Co_x(OH)_2$ and $\beta$-$Ni_{1-x}Co_xOOH$ in which x and y satisfy relations of $0 \leq y \leq 0.3$ and $0 \leq x \leq 0.25$, a Li supply source material which is a Li chemical compound used at a time of forming Li—Ni—Co—Al composite oxide, and an Al supply source material which is an Al chemical compound used at a time of forming Li—Ni—Co—Al composite oxide; and burning the resulting mixture.

2. A method of producing a positive electrode active material according to claim 1, wherein x and y satisfy relations of $0.15 \leq x \leq 0.25$ and y=0.

3. A method of producing a positive electrode active material according to claim 1, wherein x and y satisfy relations of $0 \leq x \leq 0.25$ and $0 \leq y \leq 0.3$.

4. A method of producing a positive electrode active material according to claim 3, wherein x satisfy a relation of $0 \leq x \leq 0.2$.

5. A method of producing a positive electrode active material according to claim 4, wherein x satisfy a relation of $0 \leq x \leq 0.1$.

6. A method of producing a positive electrode active material according to claim 3, wherein y satisfy a relation of $0.1 \leq y \leq 0.2$.

7. A method of producing a positive electrode active material according to claim 3, wherein said Li chemical compound comprises at least one of LiOH, $Li_2CO_3$ and $LiNO_3$.

8. A method of producing a positive electrode active material according to claim 3, wherein said Al chemical compound comprises at least one of $Al(OH)_3$ and $Al_2O_3$.

* * * * *